(12) United States Patent
Wang et al.

(10) Patent No.: US 9,557,850 B2
(45) Date of Patent: Jan. 31, 2017

(54) DYNAMIC ARTIFACT COMPENSATION SYSTEMS AND METHODS

(71) Applicant: APPLE INC., Cupertino, CA (US)

(72) Inventors: Chaohao Wang, Sunnyvale, CA (US);
Paolo Sacchetto, Cupertino, CA (US);
Zhibing Ge, Sunnyvale, CA (US);
Cheng Chen, Cupertino, CA (US);
Shih-Chyuan Fan Jiang, Cupertino, CA (US)

(73) Assignee: APPLE INC., Cupertino, CA (US)

(*) Notice: Subject to any disclaimer, the term of this patent is extended or adjusted under 35 U.S.C. 154(b) by 130 days.

(21) Appl. No.: 14/630,280

(22) Filed: Feb. 24, 2015

(65) Prior Publication Data
US 2016/0246430 A1 Aug. 25, 2016

(51) Int. Cl.
*G09G 5/10* (2006.01)
*G06F 3/041* (2006.01)
*G06F 3/044* (2006.01)
*G09G 3/20* (2006.01)

(52) U.S. Cl.
CPC .......... *G06F 3/0416* (2013.01); *G06F 3/044* (2013.01); *G06F 3/0412* (2013.01); *G09G 3/2011* (2013.01); *G09G 2310/027* (2013.01); *G09G 2320/0266* (2013.01); *G09G 2320/0271* (2013.01)

(58) Field of Classification Search
CPC ...... G06F 3/0416; G06F 3/044; G06F 3/0412; G09G 3/3607; G09G 3/2011; G09G 2310/027; G09G 2320/0266; G09G 2320/0271; G09G 2320/0276; G09G 2360/16

See application file for complete search history.

(56) References Cited

U.S. PATENT DOCUMENTS

| 8,026,934 B2 | 9/2011 | Tomizawa et al. |
| 8,130,325 B2 | 3/2012 | Iwakura et al. |
| 8,704,860 B2 | 4/2014 | Shibazaki et al. |

(Continued)

FOREIGN PATENT DOCUMENTS

WO  2014/054331 A1  10/2014

*Primary Examiner* — Adam R Giesy
(74) *Attorney, Agent, or Firm* — Fletcher Yoder PC

(57) ABSTRACT

One embodiment describes an electronic display. The electronic display includes display driver circuitry that display an image frame on the electronic device using a first display pixel and a second display pixel, touch sensing circuitry that detect user interaction with the electronic display, and a timing controller. The timing controller receives image data, in which the image data describes a target grayscale value of the first pixel and the second pixel to display the image frame, instructs the display driver circuitry to display a first portion of the image frame by writing the image data to the first display pixel, instructs the touch sensing circuitry to determine whether a user touch is present on a surface of the electronic display after the first portion of the image frame is displayed, determines grayscale value displayed by the second display pixel to display a previous image frame, and instructs the display driver circuitry to display a second portion of the image frame by writing adjusted image data to the second display pixel when the displayed grayscale value differs from the target grayscale value of the second pixel by more than a threshold amount.

27 Claims, 11 Drawing Sheets

(56) References Cited

U.S. PATENT DOCUMENTS

| | | | |
|---|---|---|---|
| 9,105,227 B2 * | 8/2015 | Ito | G09G 3/22 |
| 9,418,600 B2 * | 8/2016 | Liang | G09G 3/3426 |
| 2008/0231571 A1 | 9/2008 | Krijn et al. | |
| 2010/0302287 A1 * | 12/2010 | Katayama | G09G 3/3648 |
| | | | 345/690 |
| 2013/0120473 A1 * | 5/2013 | Yamada | G09G 3/34 |
| | | | 345/690 |
| 2015/0070410 A1 * | 3/2015 | Huang | G09G 3/3607 |
| | | | 345/691 |
| 2015/0145832 A1 * | 5/2015 | Lin | G06F 3/0428 |
| | | | 345/175 |
| 2016/0111047 A1 * | 4/2016 | Yamato | G09G 3/3406 |
| | | | 345/102 |

* cited by examiner

DYNAMIC ARTIFACT COMPENSATION SYSTEMS AND METHODS

BACKGROUND

The present disclosure relates generally to electronic displays, and more particularly, to artifact compensation for touch-sensitive electronic displays.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Generally, an electronic display may enable information to be communicated to a user by displaying visual representations of the information, for example, as pictures, text, or videos. More specifically, the visual representations may be displayed as successive static image frames. In some embodiments, each image frame may be displayed by successively writing image data to rows of pixels in the electronic display.

In addition to outputting information, the electronic display may enable the user to communicate information to the electronic display and/or a computing system that includes the electronic display. For example, the electronic display may be a touch-sensitive display, which may detect a user touch on the surface of the electronic display. More specifically, the electronic display may detect occurrence and/or position of the user touch based at least in part on an impedance (e.g., capacitance) change in the electronic display caused by the user touch.

However, at any given time, the electronic display may generally either write image data to the display pixels or check for an impedance change via touch sensing, but not both. Thus, when image data is being written to the pixels, a user touch may be undetected. Similarly, when checking for impedance changes via touch sensing, the electronic display may stop writing image data. As such, in operation, the electronic display may alternate between writing image data to the pixels and checking for a user touch. Moreover, the touch detection accuracy may depend at least in part on frequency the electronic display checks for impedance changes. Punctuating the writing of the image data with a greater number of touch sensing impedance checks, however, could introduce perceivable artifacts.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to improving touch detection accuracy of touch-sensitive electronic displays. More specifically, the touch detection accuracy may be improved by increasing frequency an electronic display checks for a user touch. In fact, the electronic display may alternate between writing portions of image frames with checking for user touch. For example, the electronic display may write a first portion of an image frame to pixels in the electronic display, pause the writing of the image frame, check for a user touch, and write a second portion of the image frame to the pixels. As used herein, pausing the writing of an image frame to check for a user touch is generally referred to as an "intra-frame pause."

However, pausing in the middle writing of an image frame may cause perceivable visual artifacts on the electronic display, particularly when the desired brightness level (e.g., grayscale value) between successively displayed image frames is changing. More specifically, an intra-frame pause may cause a small delay between writing the first portion of the image frame and writing the second portion of the image frame. In some embodiments, when the successively displayed image frames are changing brightness level (e.g., grayscale value), the delay may cause the brightness of the second portion to be perceptively different from the first portion even when both portions are supposed to be displaying the same brightness level. For example, when the brightness is increasing, the second portion may be displayed darker than desired. On the other hand, when the brightness is decreasing, the second portion may be displayed brighter than desired.

Accordingly, in some embodiments, the image data written to the pixels after an intra-frame pause may be adjusted to compensate for the intra-frame pause. For example, when the electronic display determines that the desired brightness level of the current image frame is increasing from the previous image frame by more than a threshold amount, the grayscale value of the image data written to the pixels after the intra-frame may be over-driven (e.g., increased). On the other hand, when the electronic display determines that the desired brightness level of the current image frame is decreasing from the previous frame by more than a threshold amount, the grayscale value of the image data written to the pixels after the intra-frame pause may be under-driven (e.g., decreased). In this manner, since a human eye generally averages the brightness level of a pixel over short durations of time (e.g., time to write one image frame), adjusting the grayscale value of the image data written to pixels (e.g., by over-driving or under-driving) after an intra-frame pause may enable brightness level of the pixel to be perceived as desired.

BRIEF DESCRIPTION OF THE DRAWINGS

Various aspects of this disclosure may be better understood upon reading the following detailed description and upon reference to the drawings in which.

DETAILED DESCRIPTION

Figure 1:
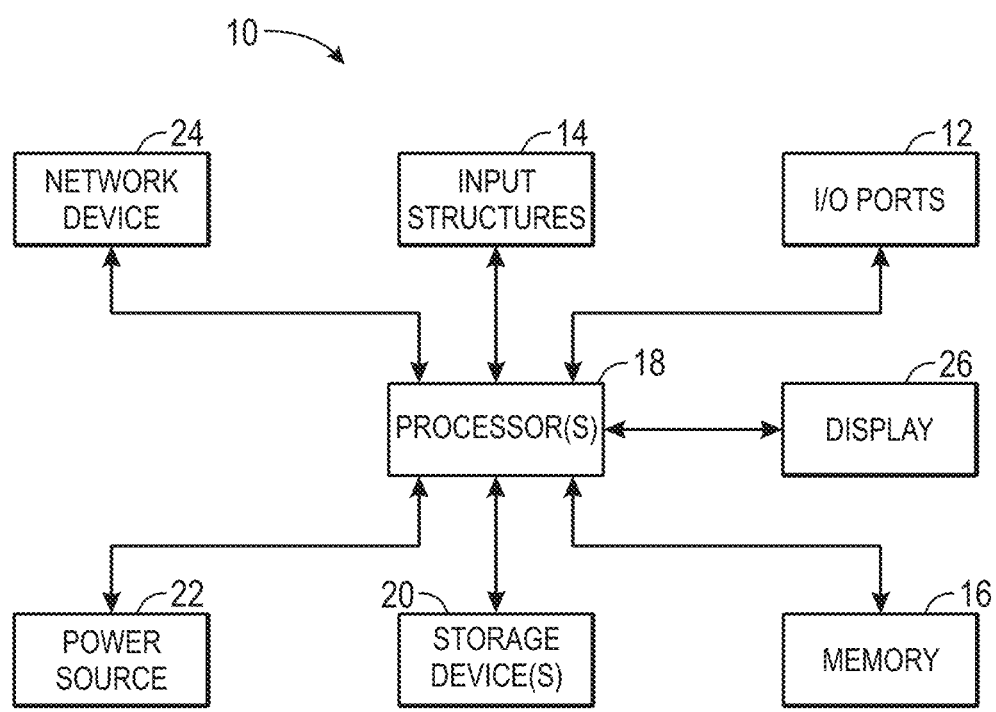
FIG. 1 is a block diagram of a computing device, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As mentioned above, a touch-sensitive electronic display may enable both the output of information to a user from a computing system as well as the input of control commands from the user to the computing system. More specifically, the electronic display may write image data to pixels to display visual representations of the information. Additionally, the electronic display may detect a user touch by checking for changes in impedance (e.g., capacitance) caused by the user touch on the surface of the electronic display.

Generally, an electronic display may alternate between writing image data and checking for a user touch. For example, the electronic display may write an entire image frame to the display pixels, check for a user touch, and repeat. However, at one time, the electronic display may only perform one of writing image data or checking for impedance changes, but not both. In other words, when the electronic display is writing image data to the pixels, a user touch during that period may go undetected.

Accordingly, to improve the user touch detection, the frequency the electronic display checks for a user touch may be increased. For example, the electronic display may write a first portion of an image frame, pause the writing of the image frame, check for an impedance change, write a second portion of the image frame, pause the writing of the image frame, check for an impedance change, and so on. As used herein, pausing the writing of an image frame to check for a user touch is generally referred to as an "intra-frame pause." In this manner, intra-frame pauses may enable the frequency the electronic display checks for a user touch to be increased, which may improve user touch detection accuracy.

However, the intra-frame pause between writing portions of an image frame may cause perceivable visual artifacts. As will be desired in more detail below, artifacts may be more likely perceivable when successively displayed image frames are changing in desired brightness level. More specifically, an intra-frame pause may cause a delay in writing image data to a pixel written after the intra-frame pause. Thus, when the brightness level is changing, the delay may cause the brightness level to change by a less than desired amount. For example, when the brightness is increasing, the pixel may be displayed darker than desired. On the other hand, when the brightness is decreasing, the pixel may be displayed brighter than desired.

Accordingly, one embodiment of the present disclosure describes an electronic display that reduces the likelihood of perceivable visual artifacts by compensating for an intra-frame pause. As will be described in more detail below, the electronic display may include a timing controller (TCON) that compares the successively displayed image frames. More specifically, the timing controller may compare the desired brightness level for the current image frame with the displayed brightness level of the previous image frame. When the desired brightness level differs from the displayed brightness level by more than a threshold amount, the timing controller may adjust the grayscale value of the image data written to pixels after an intra-frame pause so that the pixels may be perceived by a user at the desired brightness level. For example, when the desired brightness level is greater than the displayed brightness level by more than the threshold amount, the timing controller may over-drive (e.g., increase) the grayscale value of the image data written to the pixels after the intra-frame pause. On the other hand, when the desired brightness level is less than the displayed brightness level by more than the threshold In perceiving the visual representations displayed on the electronic display, a user's eyes generally averages the brightness level of a pixel across a short period of time (e.g., time used to write an image frame). As such, the user's eyes may average out undesired brightness levels caused by the intra-frame pause with the adjusted brightness level to perceive the desired brightness levels. Thus, the techniques described herein may enable an electronic display to improve user touch detection accuracy while minimizing the likelihood of perceivable visual artifacts. To help illustrate, a computing device 10 that utilizes a touch-sensitive electronic display 12 is described in FIG. 1. As will be described in more detail below, the computing device 10 may be any suitable computing device, such as a handheld computing device, a tablet computing device, a notebook computer, and the like.

Accordingly, as depicted, the computing device 10 includes the display 12, input structures 14, input/output (I/O) ports 16, one or more processor(s) 18, memory 20, nonvolatile storage 22, a network interface 24, and a power source 26. The various components described in FIG. 1 may include hardware elements (including circuitry), software elements (including computer code stored on a non-transitory computer-readable medium), or a combination of both hardware and software elements. It should be noted that FIG. 1 is merely one example of a particular implementation and is intended to illustrate the types of components that may be present in the computing device 10. Additionally, it should be noted that the various depicted components may be combined into fewer components or separated into additional components. For example, the one or more processors 18 may include a graphical processing unit (GPU).

As depicted, the processor 18 is operably coupled with memory 20 and/or nonvolatile storage device 22. More specifically, the processor 18 may execute instruction stored in memory 20 and/or non-volatile storage device 22 to perform operations in the computing device 10, such as outputting image data to the display 12. As such, the processor 18 may include one or more general purpose microprocessors, one or more application specific processors (ASICs), one or more field programmable logic arrays (FPGAs), or any combination thereof. Additionally, memory 20 and/or non volatile storage device 22 may be a tangible, non-transitory, computer-readable medium that stores instructions executable by and data to be processed by the processor 18. In other words, the memory 20 may include random access memory (RAM) and the non-volatile storage device 22 may include read only memory (ROM), rewritable flash memory, hard drives, optical discs, and the like. By way of example, a computer program product containing the instructions may include an operating system or an application program.

Additionally, as depicted, the processor 18 is operably coupled with the network interface 24 to communicatively couple the computing device 10 to a network. For example, the network interface 24 may connect the computing device 10 to a personal area network (PAN), such as a Bluetooth network, a local area network (LAN), such as an 802.11x Wi-Fi network, and/or a wide area network (WAN), such as a 4G or LTE cellular network. Furthermore, as depicted, the processor 18 is operably coupled to the power source 26, which provides power to the various components in the computing device 10. As such, the power source 26 may include any suitable source of energy, such as a rechargeable lithium polymer (Li-poly) battery and/or an alternating current (AC) power converter.

As depicted, the processor 18 is also operably coupled with I/O ports 16, which may enable the computing device 10 to interface with various other electronic devices, and input structures 14, which may enable user interaction with the computing device 10. Accordingly, the inputs structures 14 may include buttons, keyboards, mice, trackpads, and the like. In addition to the input structures 14, the display 12 may include touch sensing components to enable user inputs via user touches to the surface of the display 12. In fact, in some embodiments, the electronic display 12 may detect multiple user touches at once.

In addition to enabling user inputs, the display 12 may display visual representations via one or more static image frames. In some embodiments, the visual representations may be a graphical user interface (GUI) for an operating system, an application interface, text, a still image, or a video. As depicted, the display 12 is operably coupled to the processor 18, which may enable the processor 18 (e.g., image source) to output image data to the display 12.

Based on the received image data, the display 12 may then write image frames to the display pixels in the display 12 to display a visual representation. As will be described in more detail below, once the display 12 receives the image data, additional processing may be performed on the image data to further improve the accuracy of the viewed visual representation. For example, the display 12 may adjust the grayscale value of the image data before writing the image data to the pixels to reduce the likelihood of perceivable visual artifacts caused by an intra-frame pause.

Figure 2:
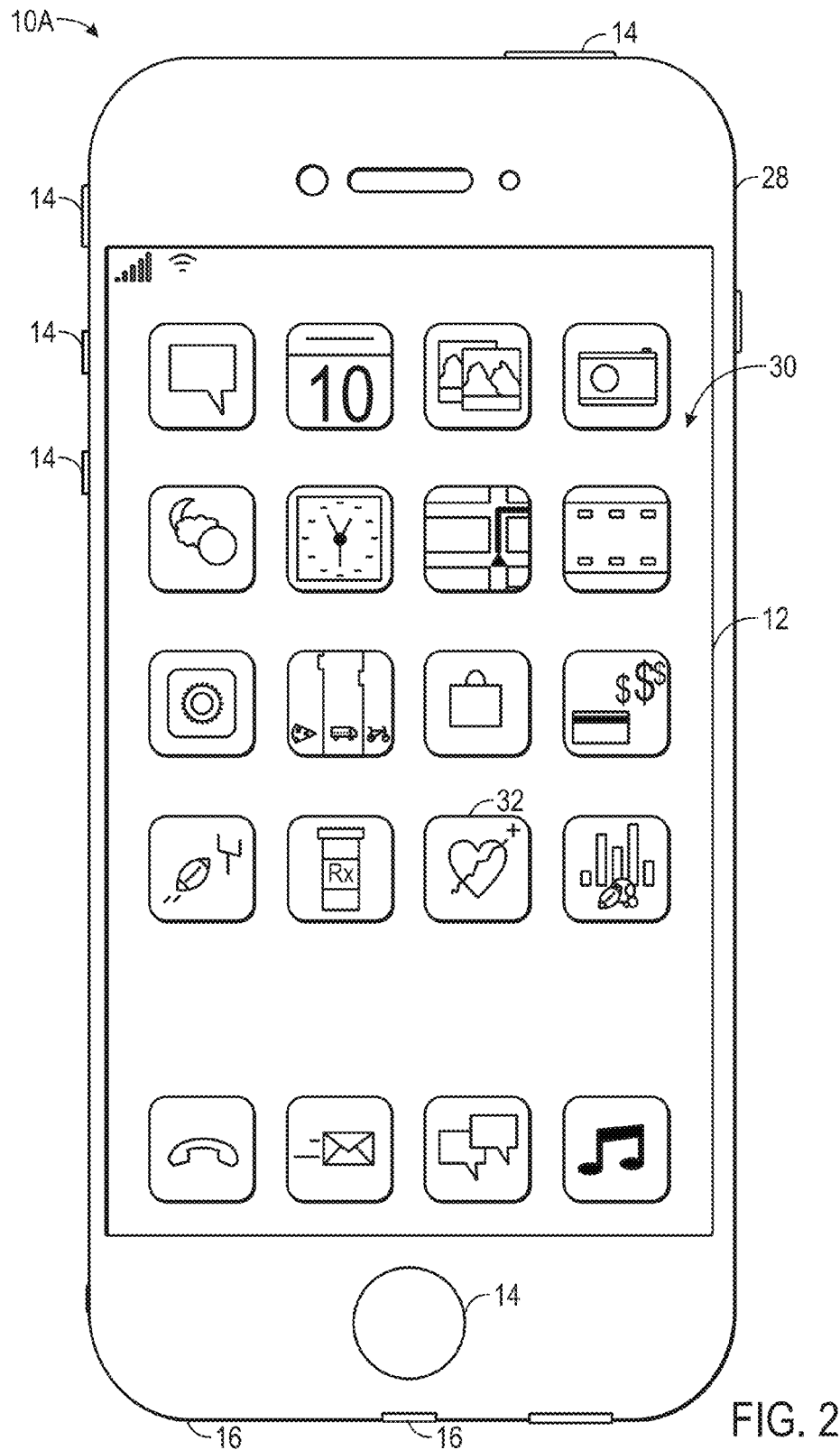
FIG. 2 is an example of the computing device of FIG. 1, in accordance with an embodiment.

As described above, the computing device 10 may be any suitable electronic device. To help illustrate, one example of a handheld device 10A is described in FIG. 2, which may be a portable phone, a media player, a personal data organizer, a handheld game platform, or any combination of such devices. For example, the handheld device 10A may be any iPhone model from Apple Inc. of Cupertino, Calif.

As depicted, the handheld device 10A includes an enclosure 28, which may protect interior components from physical damage and to shield them from electromagnetic interference. The enclosure 28 may surround the display 12, which, in the depicted embodiment, displays a graphical user interface (GUI) 30 having an array of icons 32. By way of example, when an icon 32 is selected either by an input structure 14 or a touch sensing component of the display, an application program may launch.

Additionally, as depicted, input structure 14 may open through the enclosure 28. As described above, the input structures 14 may enable a user to interact with the handheld device 10A. For example, the input structures 14 may activate or deactivate the handheld device 10A, navigate a user interface to a home screen, navigate a user interface to a user-configurable application screen, activate a voice-recognition feature, provide volume control, and toggle between vibrate and ring modes. Furthermore, as depicted, the I/O ports 16 open through the enclosure 28. In some embodiments, the I/O ports 16 may include, for example, an audio jack to connect to external devices.

Figure 3:
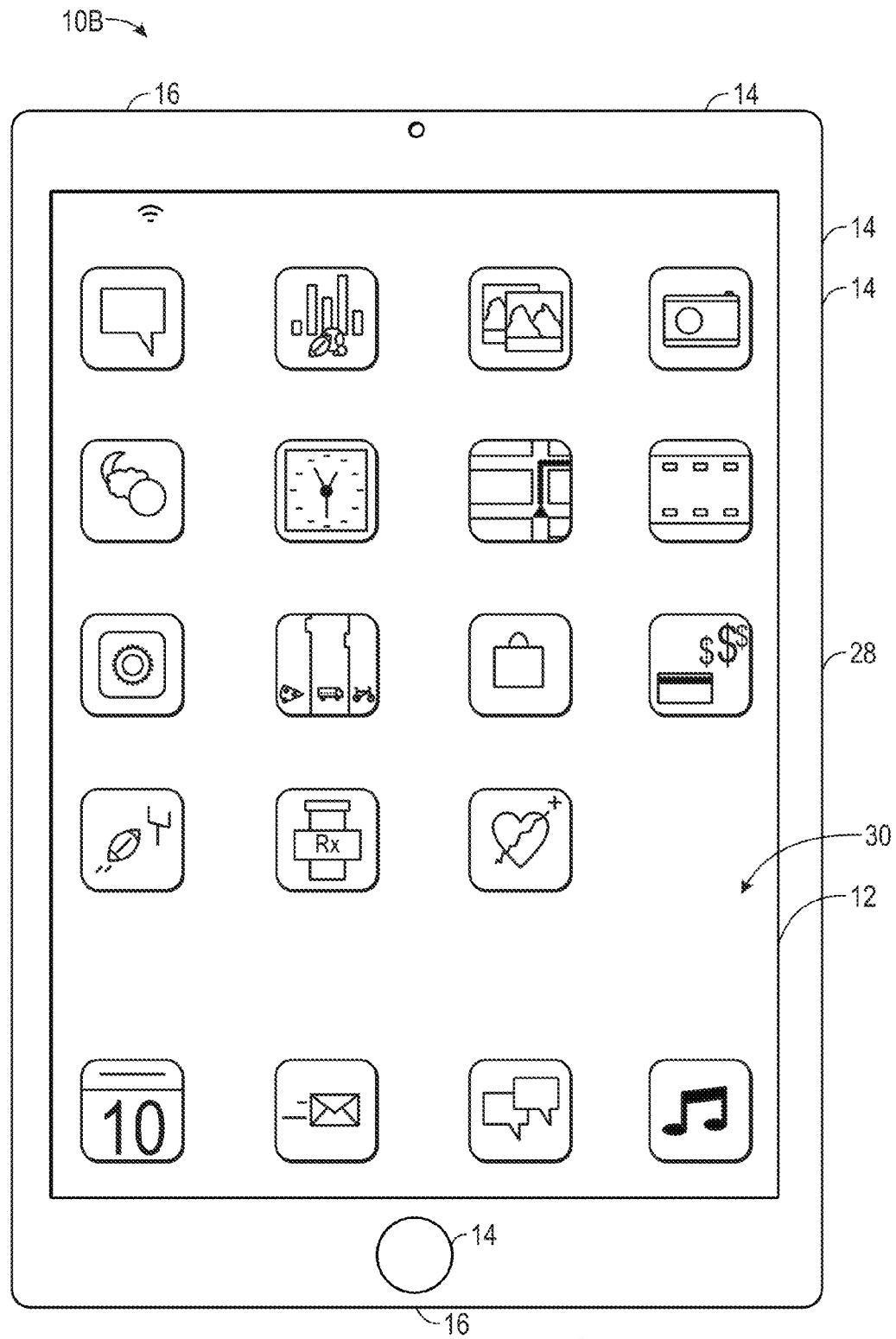
FIG. 3 is an example of the computing device of FIG. 1, in accordance with an embodiment.
Figure 4:
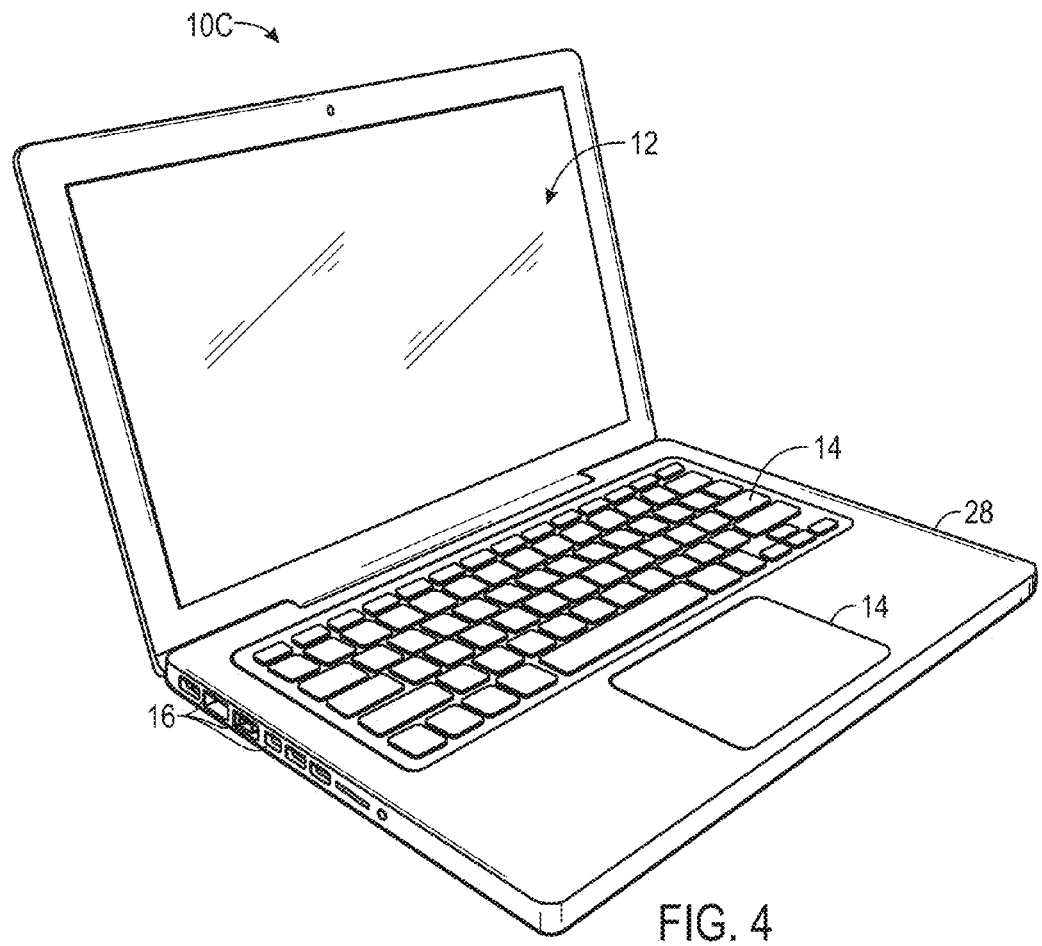
FIG. 4 is an example of the computing device of FIG. 1, in accordance with an embodiment.

To further illustrate a suitable computing device 10, a tablet device 10B is described in FIG. 3, such as any iPad model available from Apple Inc. Additionally, in other embodiments, the computing device 10 may take the form of a computer 10C as described in FIG. 4, such as any MacBook or iMac model available from Apple Inc. As depicted, the computer 10C also includes a display 12, input structures 14, I/O ports 16, and a housing 28.

As described above, the display 12 may facilitate communication of information between the computing system 10 and a user, for example, by displaying visual representations based on image data received from the processor 18 and detecting user touch on the surface of the display 12. To help illustrate, a portion 34 of the computing device 10 is described in FIG. 5. As depicted, the processor 18 and the display 12 are communicatively coupled via a data bus 36, which may enable the processor 18 to transmit image data to the display 12 indicating occurrence and/or position of a user touch to the processor 18.

Figure 6:
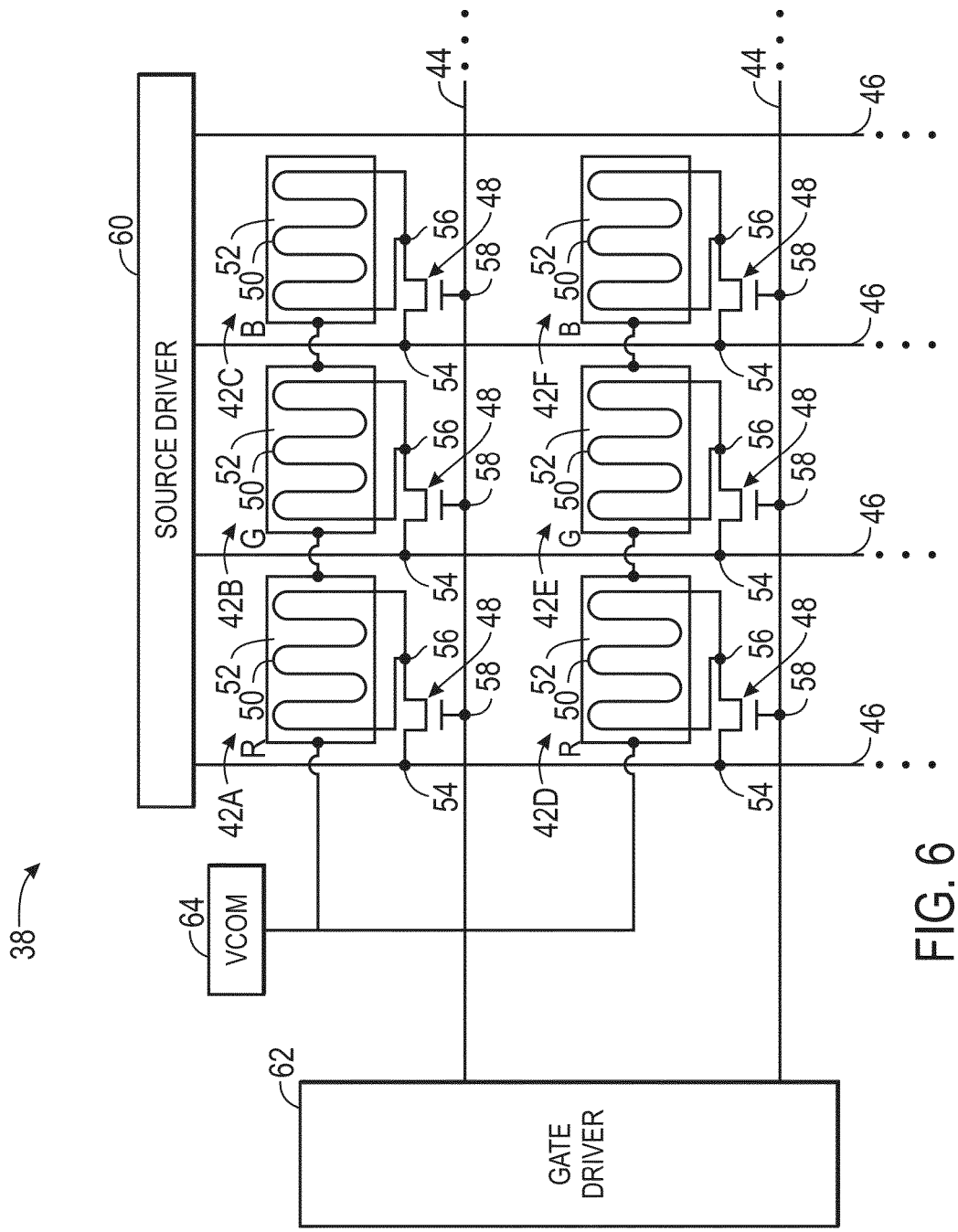
FIG. 6 is a schematic diagram of display components of an electronic display, in accordance with an embodiment.

To facilitate such operations, the display 12 may include display components (e.g., display driver circuitry) 38 and touch sensing components (e.g., touch sensing circuitry) 40. More specifically, the display components 38 may include any suitable components used to display an image frame on the display 12. For example, when the display 12 is a liquid crystal display, the display components 38 may include a thin film transistor (TFT) layer and a liquid crystal layer organized as display pixels. To help illustrate, operation of display components 38 used in a liquid crystal display are described in FIG. 6.

In the depicted embodiment, the display components 38 include a number of display pixels 42 disposed in a pixel array or matrix. More specifically, each display pixel 42 may be defined at the intersection of a gate line 44 (e.g. scanning line) and a source lines 106 (e.g., data line). Although only six display pixels 42, referred to individually by the reference numbers 42A-42F, are shown for purposes of simplicity, it should be understood that in an actual implementation, each source line 46 and gate line 44 may include hundreds or thousands of such display pixels 42.

As described above, image data may be written to each of the display pixels 42 to display an image frame. More specifically, image data may be written to a display pixel 42 by using a thin film transistor 48 to selectively store an electrical potential (e.g., voltage) on a respective pixel electrode 50. Accordingly, in the depicted embodiment, each thing film transistor 48 includes a source 54, which is electrically connected to a source line 46, a drain 56, which is electrically connected to a pixel electrode 50, and a gate 58, which is electrically connected to a gate line 44.

Thus, to write image data to a row of display pixels 42 (e.g., 42A-42C), the corresponding gates 48 may be activated (e.g., turned on) by a scanning signal on the gate line 44. Image data may then be written to the row of display pixels by storing an electrical potential corresponding with the grayscale value of the image data from the source lines 46 to the pixel electrode 50. The potential stored on the pixel electrode 50 relative to a potential of a common electrode 52 may then generate an electrical field sufficient to alter the arrangement of the liquid crystal layer (not shown). More specifically, this electrical field may align the liquid crystal molecules within the liquid crystal layer to modulate light transmission through the display pixel 42. In other words, as the electrical field changes, the amount of light passing through the display pixel 42 may increase or decrease. As such, the perceived brightness level of the display pixel 42 may be varied by adjusting the grayscale value of the image data. In this manner, an image frame may be displayed by successively writing image data the rows of display pixels 42.

To facilitate writing image data to the display pixels 42, the display components 38 may also include a source driver 60, a gate driver 62, and a common voltage (Vcom) source 64. More specifically, the source driver 60 may output the image data (e.g., as an electrical potential) on the source lines 46 to control electrical potential stored in the pixel electrodes 50. Additionally, the gate driver 62 may output a gate signal (e.g., as an electrical potential) on the gate lines 44 to control activation of rows of the display pixels 42. Furthermore, the Vcom source 64 may provide a common voltage to the common electrodes 52.

Figure 7:
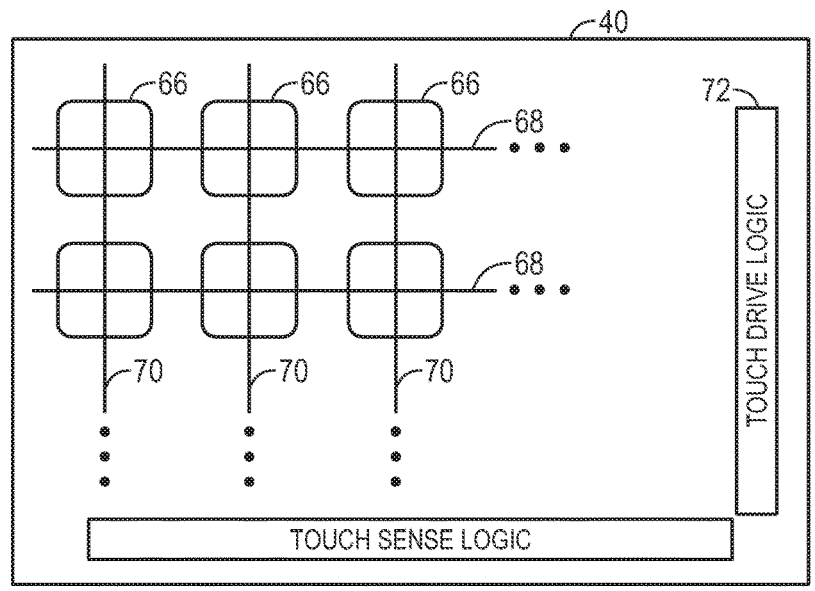
FIG. 7 is a schematic diagram of touch sensing components of the electronic display, in accordance with an embodiment.

Similarly, the touch sensing components 40 may include any suitable components used to detect occurrence and/or presence of a user touch on the surface of the display 12. To help illustrate, operation of touch sensing components 40 that may be used in a capacitive touch sensitive display 12 are described in FIG. 7.

In the depicted embodiment, the touch sensing components 40 include a number of touch pixels 66 disposed in a pixel array or matrix. More specifically, each touch pixel 66 may be defined at the intersection of a touch drive line 68 and a touch sense line 70. Although only six touch pixels 66 are shown for purposes of simplicity, it should be understood that in an actual implementation, each touch drive line 68 and touch sense line 70 may include hundreds or thousands of such touch pixels 66.

As described above, occurrence and/or position of a user touch may be detected based on impedance changes caused by the user touch. To facilitate detecting impedance changes, the touch sensing components 40 may include touch drive logic 72 and touch sense logic 74. More specifically, the touch drive logic 72 may output touch drive signals at various frequencies and/or phases on the touch drive lines 68. When an object, such as a user finger, contacts the surface of the display 12, the touch sense lines 70 may respond differently to the touch drive signals, for example by changing impedance (e.g., capacitance). More specifically, the touch sense lines 70 may generate touch sense signals to enable the touch sense logic 74 to determine occurrence and/or position of the object on the surface of the display 12.

In some embodiments, the touch sensing components 40 may utilize dedicated touch drive lines 68, dedicated touch sense lines 70, or both. Additionally or alternatively, the touch drive lines 68 and/or the touch sense lines 70 may utilize one or more of the display components 38. For example, the touch drive lines 68 and/or the touch sense lines 70 may be formed from one or more gate lines 44, one or more pixel electrodes 50, one or more common electrodes 52, one or more source lines 46, or any combination thereof.

Figure 5:
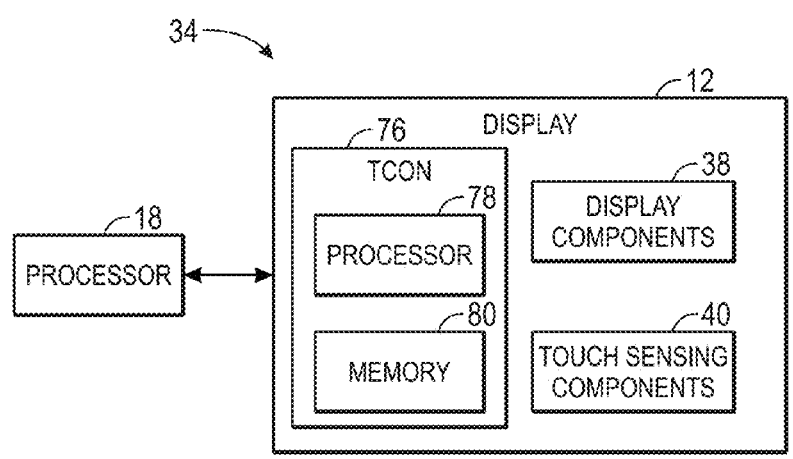
FIG. 5 is block diagram of a portion of the computing device of FIG. 1 used to display images and sense user touch, in accordance with an embodiment.

To facilitate controlling operation of both the display components 38 and the touch sensing components 40, the display 12 may include a timing controller (TCON) 76 as depicted in FIG. 5. Accordingly, the timing controller 76 may include a processor 78 and memory 80. More specifically, the processor 78 may execute instruction stored in memory 80 to perform operations in the display 12. Additionally, memory 80 may be a tangible, non-transitory, computer-readable medium that stores instructions executable by and data to be processed by the processor 78.

For example, the timing controller 76 may instruct the display components 38 to write image data to the display pixels 42 and instruct the touch sensing components 40 to check for a user touch. As described above, the frequency the touch sensing components 40 detects whether a user touch is present may be increased to improve the user touch detection accuracy. In fact, the timing controller 76 may utilize intra-frame pauses by alternating between instructing the display components 38 to write a portion of an image frame and instructing the touch sensing components 40 to check for a user touch.

Figure 8:
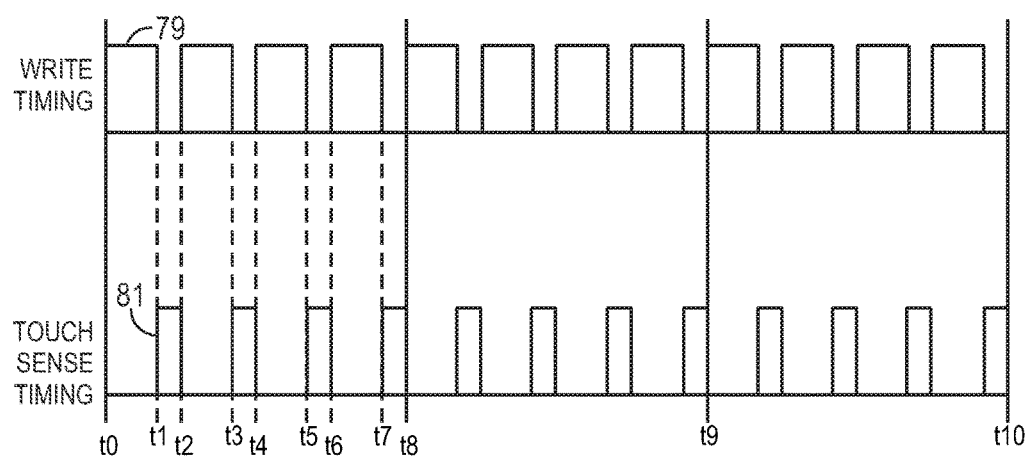
FIG. 8 is a timing diagram used by the portion of the computing device of FIG. 5 to write image frames and sense user touch, in accordance with an embodiment.

To help illustrate, a timing diagram illustrating the operation of the electronic display 12 is described in FIG. 8. More specifically, FIG. 8 describes operation of the display components 38 with a write timing plot 79 and operation of the touch sensing components 40 with a touch sensing timing plot 81 during a period when three image frames are displayed.

For the purpose of description, a first image frame is written between t0 and t8, a second image frame is written between t8 and t9, and a third image frame is written between t9 and t10. In the depicted embodiment, each image frame may be written in four separate portions. For example, between t0 and t1, the timing controller 76 may instruct the display components 38 to write a first portion of the first image frame to a quarter of the pixels 42. Between t1 and t2, the timing controller 76 may instruct the display components 38 to pause writing the first image frame and instruct the touch sensing components 40 to check for a user touch. Between t2 and t3, the timing controller 76 may instruct the display components 38 to write a second portion of the first image frame to a quarter of the pixels 42. Between t3 and t4, the timing controller 76 may again instruct the display components 38 to pause writing the first image frame and instruct the touch sensing components 40 to check for a user touch. Between t4 and t5, the timing controller 76 may instruct the display components 38 to write a third portion of the first image frame to a quarter of the pixels 42. Between t5 and t6, the timing controller 76 may again instruct the display components 38 to pause writing the first image frame and instruct the touch sensing components 40 to check for a user touch. Between t6 and t7, the timing controller 76 may instruct the display components 38 to write a fourth portion of the first image frame to a quarter of the pixels 42. Between t7 and t8, the timing controller 76 may again instruct the touch sensing components 40 to check for a user touch.

As described above, an intra-frame pause may occur when the display 12 pauses writing an image frame to check for a user touch. Accordingly, the time periods from t1 to t2, t3 to t4, and t5 to t6 may each be referred to as an intra-frame pause. As depicted, the intra-frame pauses enable the frequency with which the display 12 checks for a user touch to be increased. For example, in the depicted embodiment, the display 12 may check for a user touch four times during the time period one image frame is written. Generally, the number intra-frame pauses used may be based on desired user touch detection accuracy. For example, the number of intra-frame pauses may be increased to improve user touch detection accuracy. As such, writing of an image frame may be divided by any suitable manner (e.g., 1, 2, 3, 4, 5, or more intra-frame pauses).

Figure 9A:
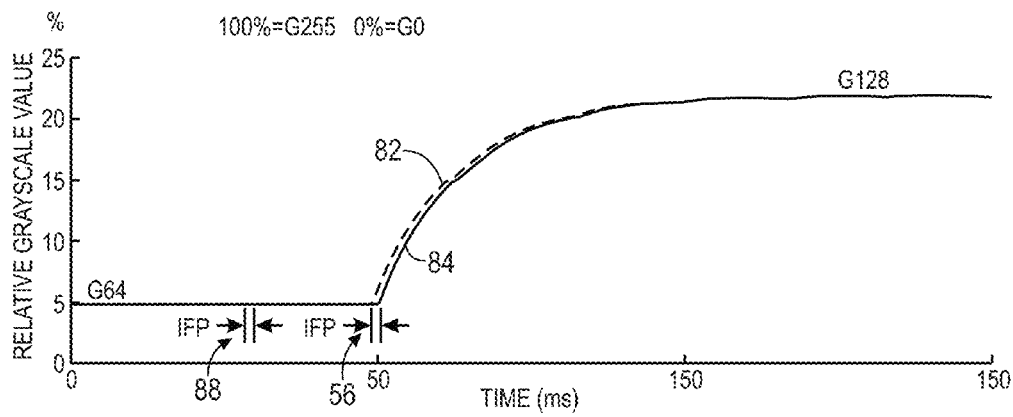
FIG. 9A is a plot of grayscale value of a pixel before an intra-frame pause compared to a pixel after the intra-frame pause, in accordance with an embodiment.

However, as described above, an intra-frame pause may also potentially cause a perceivable visual artifact, such as pixels being perceived at an undesired brightness level. To help illustrate, the grayscale value (e.g., brightness level) for two display pixels 42 in display 12 is described in FIG. 9A. More specifically, FIG. 9A is a plot that describes the grayscale value of a first pixel, which is written before an intra-frame pause, with a first grayscale curve 82 and the grayscale value of a second pixel, which is written after an intra-frame pause, with a second grayscale curve 84 over a period of operation between 0 to 150 ms, in which time is shown on the X-axis and relative grayscale value (e.g., brightness level) is shown on the Y-axis.

To simplify the following discussion, the techniques are described using image frames with a single intra-frame pause and with the same desired brightness level for each display pixel 42. In the depicted embodiment, the image frames displayed from 0 to 50 ms have a brightness level of 5% (e.g., grayscale value of 64). At 50 ms, the desired brightness level of the image frame is increased from the previously displayed image frames. As such, the grayscale value of the image data written to the first pixel and the second pixel are increased.

More specifically, as described by the first grayscale curve 82, the grayscale value of the image data written to the first pixel begins to be increased at 50 ms or very shortly thereafter. On the other hand, as described by the second grayscale curve 84, the grayscale value of the image data written to the second pixel begins to increase after an intra-frame pause 86, which may enable the display 12 to check for a user touch between writing image data to the first pixel and the second pixel. As depicted, the intra-frame pause 86 causes the grayscale value change of the second pixel to lag behind the first pixel. As such, the perceived brightness level of the second pixel may be less than the perceived brightness level of the first pixel.

Since an intra-frame pause is generally very short in duration (e.g., 1 or 2 ms), the intra-frame pause may only cause a perceivable brightness difference (e.g., visual artifact) when the desired brightness level is changing by more than a threshold amount. For example, in the depicted embodiment, another intra-frame pause 88 occurs at approximately 25 ms. However, since the desired brightness level is not changing, the intra-frame pause 88 does not cause a perceivable visual artifact. On the other hand, since the desired brightness level is changing at 50 ms, the intra-frame pause 86 may cause a perceivable visual artifact.

Figure 9B:
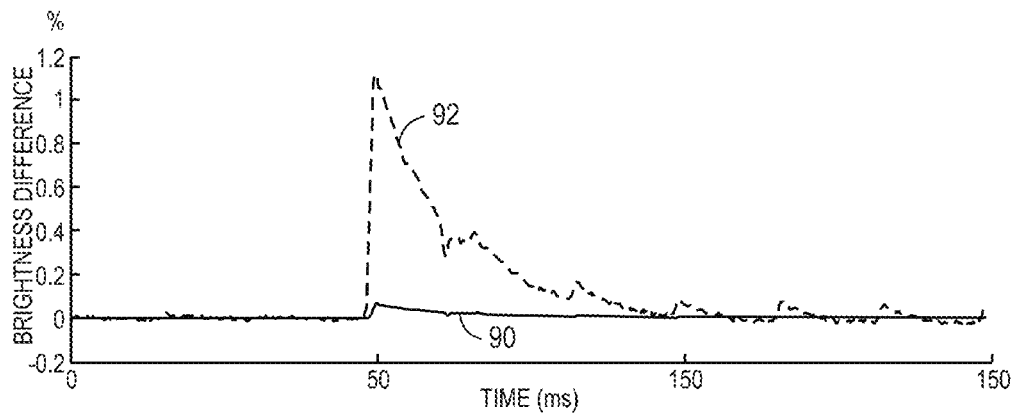
FIG. 9B is a plot of the difference between a target grayscale value and an actual grayscale value for the pixel before the intra-frame pause and the pixel after the intra-frame pause, in accordance with an embodiment.

To help illustrate, the grayscale value difference between the first pixel and the second pixel is described in FIG. 9B. More specifically, FIG. 9B is a plot that describes the difference between a target grayscale value and the grayscale value of the first pixel with a first difference curve 90 and difference between the target grayscale value and the grayscale value of the second pixel with a second difference curve 92 over the period of operation, in which time is shown on the X-axis and grayscale difference is shown on the Y-axis. As used herein, the "target grayscale value" may be the grayscale value of image data received from the image source. In other words, when the target grayscale value is written to a display pixel without an intra-frame pause, the display pixel may be at its desired brightness level.

As depicted, between 0 to 50 ms, the grayscale value of the first pixel and the second pixel are generally as desired. As such, the first pixel and the second pixel may be perceived at the desired brightness level. However, at 50 ms, both the first pixel and the second pixel vary from the target grayscale value. More specifically, as described by the first difference curve 90, even though the first pixel is written before the intra-frame pause 86, the grayscale value of the first pixel still varies slightly from the target grayscale value. In some embodiments, the difference may result from the less than instantaneous switching of the TFT 48 in the first pixel and/or that the first pixel is not in the first row of display pixels 42. Nonetheless, the difference in grayscale value of the first pixel will generally not be perceivable by a user's eyes since it varies by less than 0.1% from the target grayscale value.

On the other hand, as described by the second difference curve 92, the intra-frame pause 86 causes the grayscale value of the second pixel to vary from the target grayscale value by approximately 1.2%. In other words, the second pixel may be more than 1.1% darker than the first pixel, which may be perceivable by a user's eyes. Furthermore, since the grayscale value of the second pixel does not catch up to the grayscale value of the first pixel until the grayscale values stop substantially changing (e.g., at 100 ms), the intra-frame pause 86 may cause a perceivable artifact at the second pixel from 50 ms until close to 100 ms.

As discussed above, a visual artifact may be perceivable when an intra-frame pause causes the perceived brightness level of a pixel after the intra-frame pause (e.g., the second pixel) to vary from the desired brightness level by a perceivable amount. For example, when the desired brightness level of the second pixel increases between successive image frames, a visual artifact may be perceivable because the second pixel appears darker than desired. On the other hand, when the desired brightness level of the second pixel decreases between successive image frames, a visual artifact may be perceivable because the second pixel appears brighter than desired.

Figure 10A:
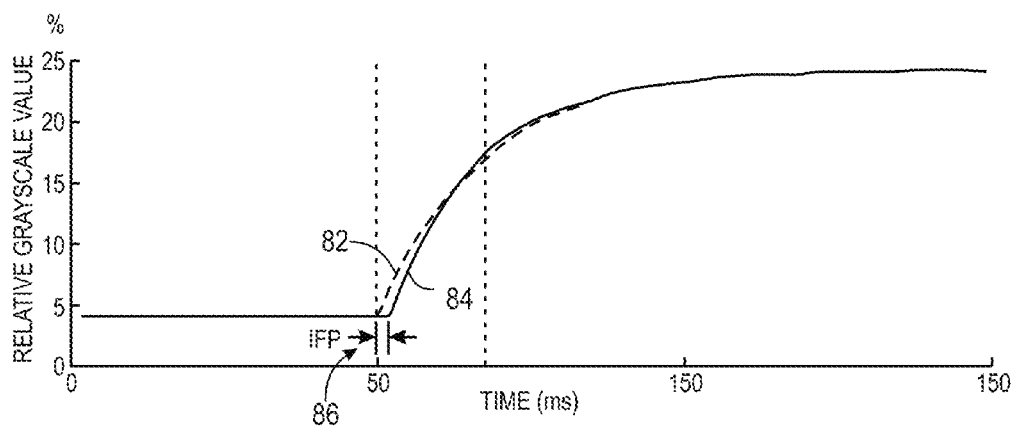
FIG. 10A is a plot of grayscale value of the pixel before an intra-frame pause compared to the pixel after the intra-frame pause with artifact compensation, in accordance with an embodiment.

Accordingly, the image data written to a pixel after an intra-frame pause (e.g., the second pixel) may be adjusted (e.g., over-driven or under-driven) to reduce the likelihood of a visual artifact being perceived. To help illustrate, the above example is continued in FIG. 10A. More specifically, FIG. 10A is a plot that describes the grayscale value of the first pixel with the first grayscale curve 82 and the adjusted grayscale value of the second pixel with a third grayscale curve 94 over a period of operation between 0 to 150 ms, in which time is shown on the X-axis and relative grayscale value is shown on the Y-axis.

As in FIG. 9A, the image frames displayed from 0 to 50 ms have a brightness level of 5% (e.g., grayscale value of 64). Additionally, at 50 ms, the desired brightness level of the image frame is increased from the previously displayed image frames. Thus, as described by the first grayscale curve 82, the grayscale value of the image data written to the first pixel begins to be increased at 50 ms or very shortly thereafter.

On the other hand, as described by the second grayscale curve 84, the grayscale value written to the second pixel begins to increase after the intra-frame pause 86. More specifically, image data received from the image source 18 is adjusted so that the grayscale value written to the second pixel increases at a faster rate. In fact, at 75 ms, the grayscale value of the second pixel is higher than the grayscale value of the first pixel. In this manner, a user's eyes may be unable to perceive a brightness difference between the first pixel and the second pixel. More specifically, the user's eyes generally average the brightness level of a pixel over a short duration of time (e.g., 25 ms). In other words, since the average brightness level of the first pixel and the second pixel between 50 to 75 ms is substantially the same, the user's eyes may perceive the first pixel and the second pixel as having the same brightness level.

Figure 10B:
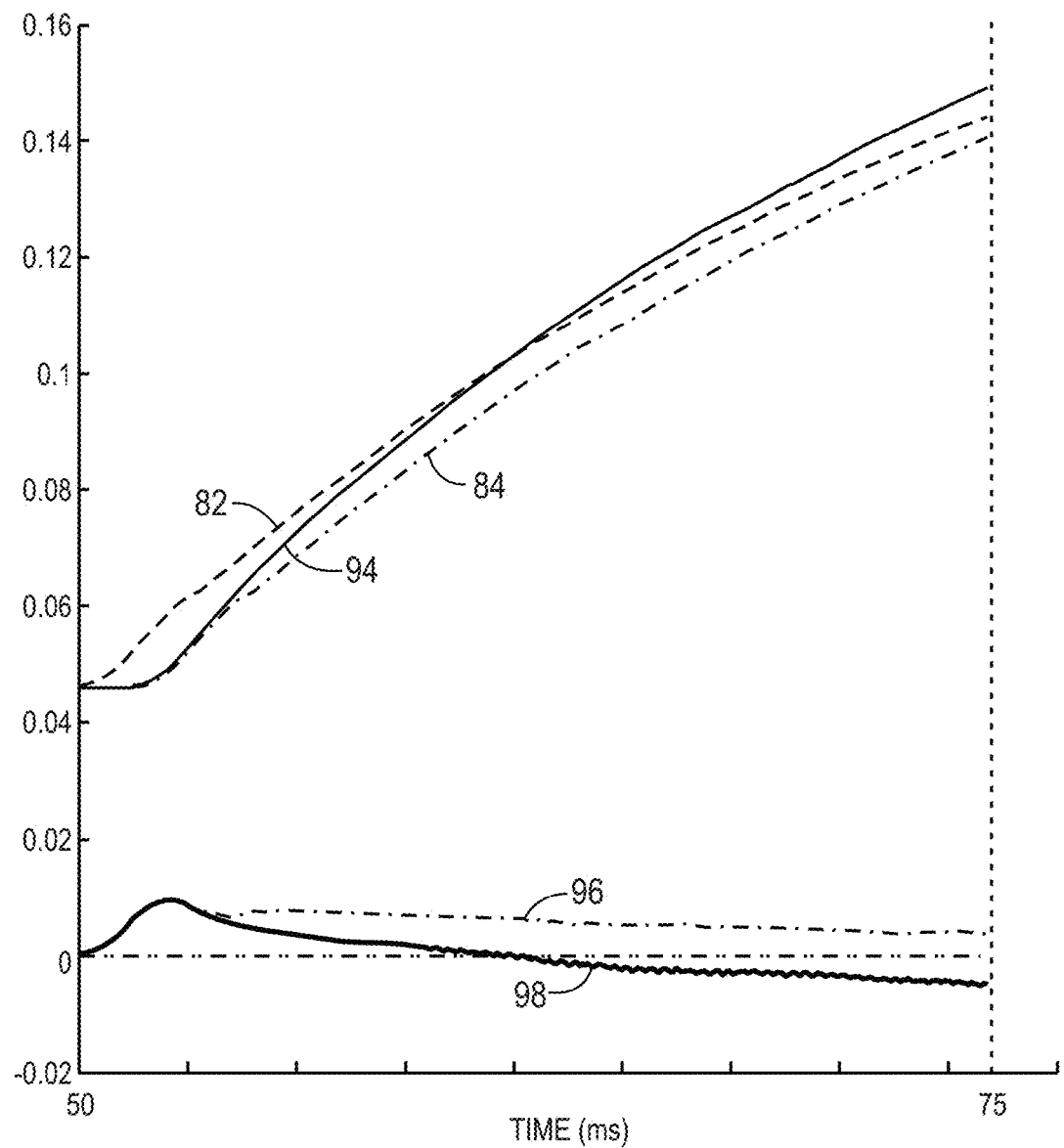
FIG. 10B is a zoomed-in view of a portion of the plot of FIG. 10A, in accordance with an embodiment.

To more clearly illustrate, the portion of the plot between 50 to 75 ms is shown in more detail in FIG. 10B. More specifically, FIG. 10B describes the first grayscale curve 82, the second grayscale curve 84 (e.g., uncompensated), and the third grayscale curve 94 (compensated). As described above, the grayscale value of the second pixel is increased after the intra-frame pause 86. Accordingly, as depicted, the second grayscale curve 84 and the third grayscale curve 94 begin to increase after the intra-frame pause 86. However, the third grayscale curve 94 increases at a faster rate than the second grayscale curve 84, which may reduce the likelihood of a perceivable artifact.

To help illustrate, FIG. 10B also describes the difference between the first grayscale curve 82 and the second grayscale curve 84 with a third difference curve 96 and the difference between the first grayscale curve 82 and the third grayscale curve 94 with a fourth difference curve 98. As described by the third difference curve 96, the intra-frame pause 86 may cause the brightness level of the first pixel to be higher (e.g., brighter) than the brightness level of the second pixel for substantially the entire duration between 50 to 75 ms when the second pixel is uncompensated.

On the other hand, as described by the fourth difference curve 98, the intra-frame pause 86 causes the brightness level of the first pixel to initially be higher (e.g., brighter) than the brightness level of the second pixel. However, since the grayscale value of the image data written to the second pixel is increased at a faster rate than the image data written to the first pixel, the brightness level of the second pixel surpasses the brightness level of the first pixel. For example, in the depicted embodiment, the brightness level of the second pixel may be lower (e.g., darker) than the first pixel from 50 to 62 ms and higher (e.g., brighter) than the first pixel from 62 to 75 ms. In this manner, the user's eyes may average the brightness level of the second pixel across 50 to 75 ms and perceive the brightness level of the second pixel as undistinguishable from the brightness level of the first pixel. As such, the likelihood of the intra-frame pause 86 causing a perceivable visual artifact is minimized.

Figure 11:
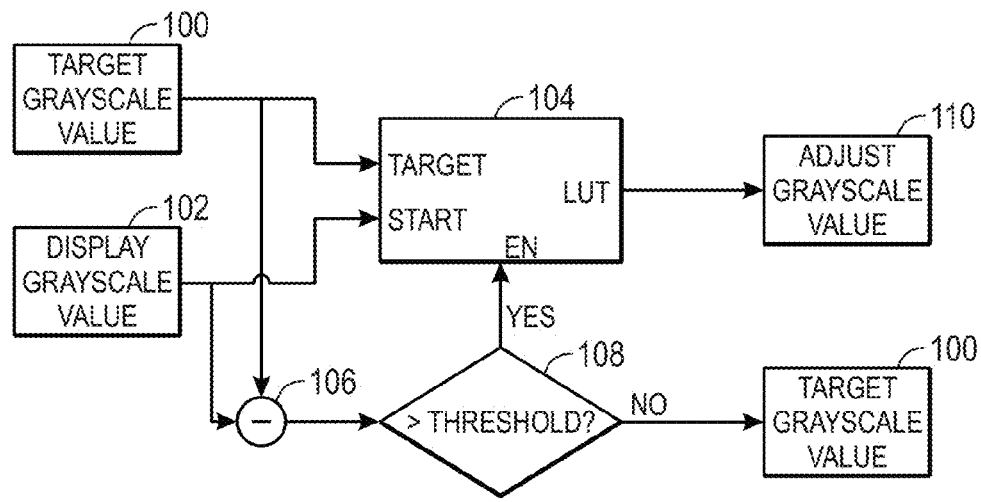
FIG. 11 is a block diagram of a control logic used to perform artifact compensation, in accordance with an embodiment.

As described above, the likelihood of visual artifact being perceived increases as the difference between the desired brightness level of successively displayed image frames increases. More specifically, it may be determined that when the desired brightness level changes by more than a threshold amount a visual artifact will likely be perceived. To help illustrate, a block diagram of logic that may be used to compensate for an intra-frame pause at a display pixel written after the intra-frame pause is described in FIG. 11.

As depicted, a target grayscale value 100 and a displayed grayscale value 102 are input to a grayscale adjustment look-up table (LUT) 104 and a comparator 106. More specifically, the display 12 may successively display a previous image frame and a current image frame. Thus, the displayed grayscale value 102 may describe the grayscale value written to the display pixel that enables the previous image frame to be displayed as desired. Additionally, the target grayscale value 100 may describe the grayscale value of image data corresponding with the current image frame received from an image source. More specifically, when the target grayscale value 100 is written to the display pixel without an intra-frame pause, the display pixel 42 illuminates at the desired brightness level. In other words, the target grayscale value 100 may indicate the desired brightness level of the display pixel 42 when the current image frame is displayed.

However, as described above, an intra-frame pause may cause a perceivable visual artifact at the display pixel. As such, the receive grayscale value 100 may be adjusted to compensate for the intra-frame pause. Accordingly, the comparator 106 may determine the amount the grayscale value of the display pixel is expected to change from the previous image frame to the current image frame by determining the difference between the target grayscale value 100 and the displayed grayscale value 102.

As described above, when the grayscale value of the display pixel is expected to change above a threshold amount, a visual artifact may be perceivable. Accordingly, when the comparator 106 determines that the threshold 108 is exceeded, the grayscale adjustment look-up table 104 may be enabled. In some embodiments, the threshold amount may be determined based on the number of intra-frame pauses, frequency image frames are displayed, number of display pixels 42 in the display 12, length of an intra-frame pause, or any combination thereof. Additionally, in some embodiments, the threshold amount may be predetermined and stored in memory 80.

When enabled, the grayscale adjustment look-up table 104 may output an adjusted grayscale value 110 to compensate for the intra-frame pause. For example, when the grayscale value is expected to decrease by more than the threshold amount 108, the grayscale adjustment look-up table 104 may output an adjusted grayscale value 110 less (e.g., darker) than the target grayscale value 100. On the other hand, when the grayscale value is expected to increase by more than the threshold amount 108, the grayscale look-up table 104 may output an adjusted grayscale value 110 higher (e.g., brighter) than the target grayscale value 100.

Generally, the grayscale adjustment look-up table 104 may determine the adjusted grayscale value 110 based at least on the target grayscale value 100 and the displayed grayscale value 102. For example, the grayscale adjustment look-up table 104 may map the target grayscale value 100 to the adjusted grayscale 110 value based on the difference between the displayed grayscale value 102 and the target grayscale value 100 (e.g., expected grayscale value change). For example, when the difference is larger, the grayscale adjustment look-up table 104 may increase the adjusted grayscale value 110 at a faster rate. Additionally, in some embodiments, the grayscale adjustment look-up table 104 may be predetermined based on various factors, such as number/size of the display pixels 42, properties of a user's eyes (e.g., image perception ability), size of the electronic display 12, and the like, and stored in memory 80.

On the other hand, when the comparator 106 determines that the threshold is not exceeded, a visual artifact is not likely to be perceivable. As such, the grayscale adjustment look-up table 104 may be disabled and the target grayscale value 100 may be written to the display pixel. In this manner, the likelihood of a perceivable artifact at the display pixel written after the intra-frame pause is reduced.

Figure 12:
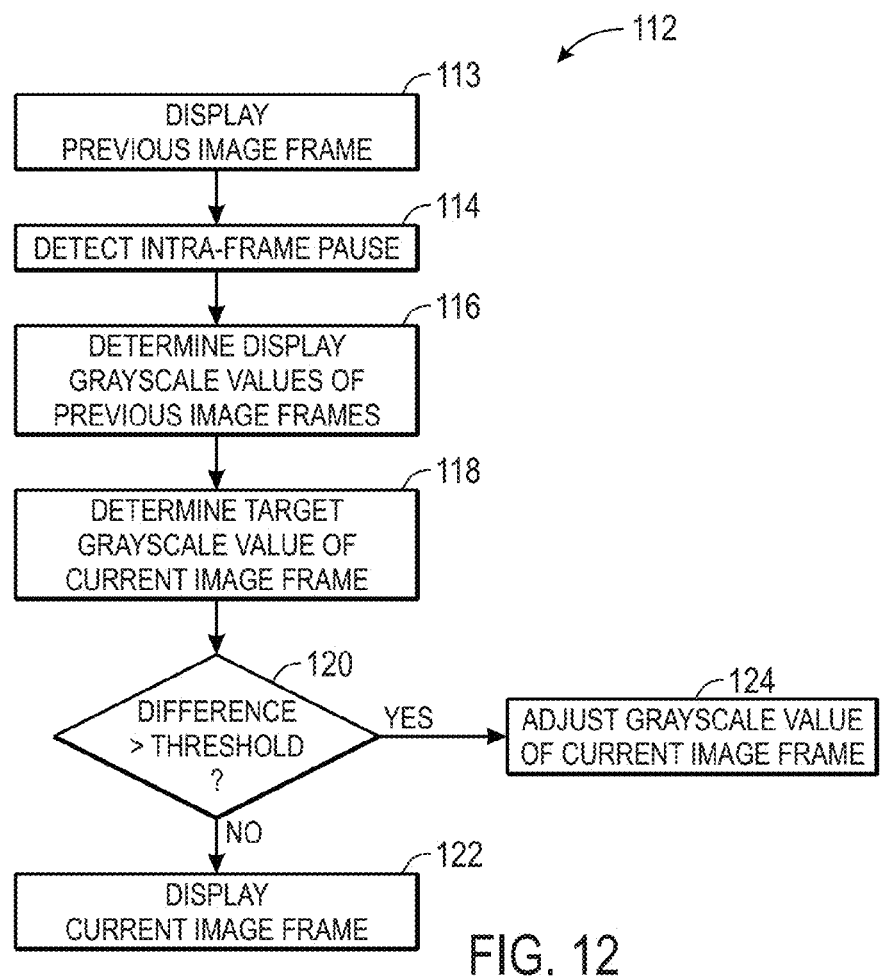
FIG. 12 is a flow diagram of a process for performing artifact compensation, in accordance with an embodiment.

As can be appreciated, an intra-frame pause may cause a delay in writing image data to each display pixel written after the intra-frame pause. As such, the grayscale value written to any of the display pixels after the intra-frame pause may be adjusted. One embodiment of a process 112 that may be used to compensate for an intra-frame pause is described in FIG. 12. Generally, the process 112 includes displaying a previous image frame and a portion of a current image frame (process block 113), detecting an intra-frame pause (process block 114), determining displayed grayscale value of the previous image frame (process block 116), determining target grayscale value the current image frame (process block 118), determining whether the difference between the displayed grayscale value and the target grayscale value is greater than a threshold (decision block 120), and displaying the current image frame (process block 122). Additionally, when the difference is greater than the threshold, the process 112 includes adjusting the grayscale value of the current image frame before the current image frame is displayed (process block 124). In some embodiments, one or more steps process 112 may be implemented with instructions stored in a tangible non-transitory computer readable medium, such as memory 80, and executed by one or more processing units, such as processor 78.

Accordingly, the timing controller 76 may instruct the display components 38 to display a previous image frame and a portion of a current image frame (process block 113). More specifically, the timing controller 76 may instruct the display components 38 to write a first set of grayscale values to one or more rows of the electronic display to display the previous image frame. After the previous image frame is displayed, the timing controller 76 may instruct the display components 38 to write a second set of grayscale values to one or more rows to display a portion of the current image frame.

During the writing of the current image frame, the timing controller 76 may determine when an intra-frame pause occurs (process block 114). Generally, intra-frame pauses may occur at fixed intervals, which may be stored in memory 80. As such, the timing controller 76 may determine the fixed interval from memory 80 and implement the intra-frame pauses. More specifically, the timing controller 76 may instruct the display components 38 to pause writing the current image frame to the display pixels 42 and instruct the touch sensing components 40 to check for a user touch.

Additionally, during the intra-frame pause, the timing controller 76 may determine the displayed grayscale values (e.g., first set of grayscale values) 102 of the previous image frame (process block 116). In some embodiments, the image data written to the display pixels 42 is stored in a buffer, which may be included in memory 80. Accordingly, the timing controller 76 may retrieve the corresponding image data from memory 80 to determine the first set of grayscale values (e.g., displayed grayscale value 102) written to the display pixels 42 to display the previous image frame. More specifically, the timing controller 76 may determine the displayed grayscale value 102 for at least the display pixels 42 still displaying the previous image frame.

Furthermore, during the intra-frame pause, the timing controller 76 may determine the target grayscale value 100 of a current image frame (process block 118). More specifically, the target grayscale value 100 may be received with image data from the image source (e.g., processor 18). In some embodiments, the image data received from the image source may be stored in a buffer, which may be included in memory 80. Accordingly, the timing controller 76 may retrieve the corresponding image data from memory 80 to determine the target grayscale value 100 of the current image frame.

Additionally, as described above, a portion of the current image frame may be displayed before the intra-frame pause and a portion of the current image frame may be displayed after the intra-frame pause. As such, the timing controller 76 may determine the target grayscale value 100 (e.g., a fourth set of grayscale values) for at least the display pixels written after the intra-frame pause.

The timing controller 76 may then compare the displayed grayscale values of the previous image frame to the target grayscale value of the current image frame (decision block 120), for example, using the comparator 106. More specifically, the timing controller 76 may determine whether grayscale value for each display pixel written after the intra-frame pause is expected to change by more than a threshold amount (e.g., difference between displayed grayscale value 102 to the target grayscale value 100). In other words, the timing controller 76 may determine whether a perceivable visual artifact is likely displayed at each pixel written after the intra-frame pause.

The timing controller 76 may then instruct the display components 38 to write a portion of the current image frame to the display pixels (process block 122). More specifically, when the grayscale value is not expected to change by more than the threshold amount, the timing controller 76 may instruct the display components 38 to display a portion of current image frame by writing the image data received from the image source to the display pixels 42 without substantial adjustment. In other words, the target grayscale value 100 may be written to the display pixels 42 to display the current image frame as desired.

On the other hand, when the grayscale value is expected to change by more than the threshold amount, the timing controller 76 may determine an adjusted grayscale value (e.g., a third set of grayscale values) 110 before instructing the display components 38 to display the portion of the current image frame. In some embodiments, the timing controller 76 may utilize the grayscale adjustment look-up table 104 to map the target grayscale value 100 to the adjusted grayscale value 110. In other embodiments, the timing controller 76 may use algorithms to calculate the adjusted grayscale value 110. Additionally, once the grayscale value of the image data is adjusted, the image data may be stored in the buffer to enable the timing controller 76 to determine whether a perceivable artifact may be displayed in a next successive image frame. In other words, the grayscale value (e.g., target grayscale value 100 or adjusted grayscale value 110) written to the display pixel to display the current image frame may be used as the displayed grayscale value 102 to determine whether a perceivable artifact is likely when the next successive image frame is displayed.

In this manner, the likelihood of an intra-frame pause causing a perceivable visual artifact is minimized. More specifically, as described above, the likelihood of perceivable visual artifacts may be minimized by over-driving (e.g., increasing) the grayscale value when the desired brightness level of successively display image frames is increasing by more than a threshold amount.

Figure 13A:
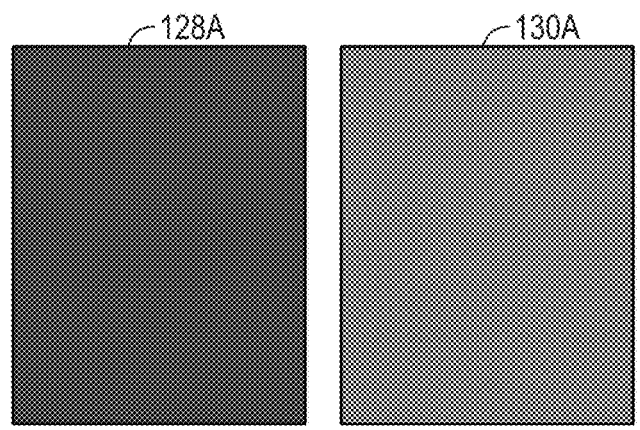
FIG. 13A illustrates successively displayed image frames with increasing brightness levels, in accordance with an embodiment.
Figure 13B:
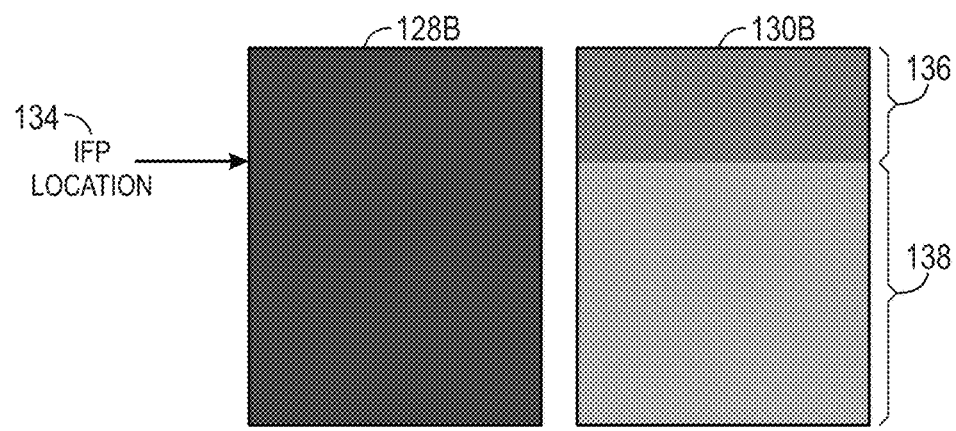
FIG. 13B illustrates the image frames of FIG. 13A with a first embodiment of artifact compensation, in accordance with an embodiment.
Figure 13C:
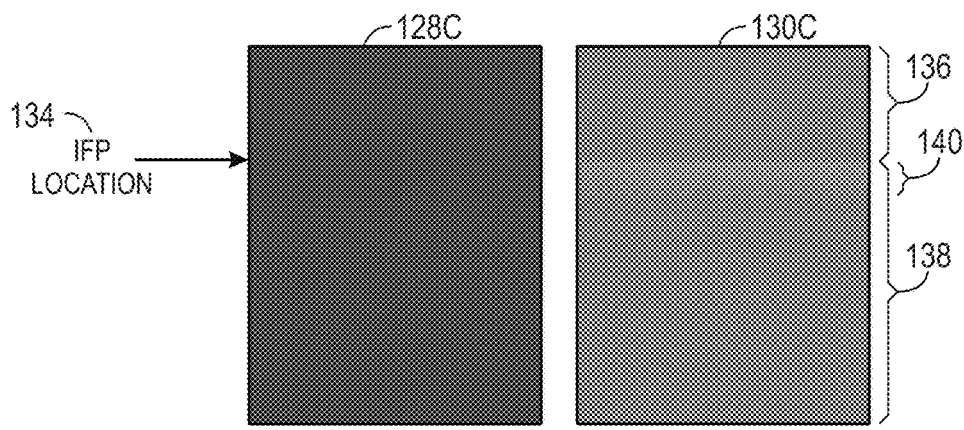
FIG. 13C illustrates the image frames of FIG. 13A with a second embodiment of artifact compensation, in accordance with an embodiment.

To help illustrate, two successively displayed image frames that can be displayed on the electronic display 12 are described in FIGS. 13A-13C. More specifically, FIGS. 13A-13C describe a first image frame 128 and a second image frame 130 displayed immediately after the first image frame 128.

FIG. 13A describes the desired brightness level (e.g., target grayscale value) of the first image frame 126A and the second image frame 128A. In other words, the image frames 126A and 128A may be displayed when image data received from image source is written to the display pixels 42 without the use of an intra-frame pause. Additionally, as depicted, the desired brightness level increases from the first image frame 128A to the second image frame 130A. In other words, the electronic display 12 is successively displaying image frames with increasing brightness levels.

FIG. 13B describes the grayscale value written to the display pixels 42 to achieve the desired brightness levels when an intra-frame pause 134 is used. In other words, a first portion 136 of the image frames 128B and 130B are displayed before the intra-frame pause 134 and a second portion 138 of the image frames 128B and 130B are displayed after the intra-frame pause 134.

However, as described above, when the image data received from the image source is displayed with the use of an intra-frame pause, visual artifacts may be perceivable, particularly when the grayscale value of a display pixel is expected to change by more than a threshold amount. For the purpose of illustration, we assume that the grayscale value for each of the display pixels in the second portion 138 is expected to change by more than the threshold amount between the first image frame 128B and the second image frame 130B. Accordingly, as depicted, the grayscale value written to the display pixels in the second portion 138 of the second image frame 130B are over-driven (e.g., increased).

It is noted that the second image frame 130B is merely one instant in time, for example, immediately before a next image frame is displayed. As described above, the grayscale value of the display pixels may be over-driven by increasing the grayscale value at a faster rate. In other words, the grayscale value written to display the second image 130B may be changing. For example, the grayscale value of the first portion 136 may initially be higher (e.g., brighter) than the grayscale value of the second portion 138 due to the intra-frame pause 134. However, since increased at a faster rate, the grayscale value of the second portion 138 may surpass the grayscale value of the first portion 140. In this manner, the user's eyes may average the changing grayscale value of the second portion 138 and perceive the second image frame 130B at the desired brightness level.

In other embodiments, it may be possible to minimize the perceivability of visual artifacts. For example, instead of compensating each display pixel after the intra-frame pause 134, only a transition portion may be compensated. For example, FIG. 13C describes the grayscale value written to the display pixels 42 to reduce the perceivability of visual artifacts. As in FIG. 13B, a first portion 136 of the image frames 128B and 130B are displayed before the intra-frame pause 134 and a second portion 138 of the image frames 128B and 130B are displayed after the intra-frame pause 134.

As depicted, only a transition portion 140 of the grayscale values of the display pixels after the intra-frame pause 134 (e.g., 40 rows of display pixels) are compensated. More specifically, the grayscale values written to the transition portion 140 may be adjusted to generate a gradient. In other words, the display pixels closer to the intra-frame pause 134 may be over-driven more than display pixels further from the intra-frame pause 134.

In this manner, the user's eyes may average the grayscale values written to the transition portion 140 so that a smooth brightness transition is formed between the first portion 136 and the second portion 138 of the second image frame 130C. In other words, the brightness level of the second image frame 130C may not exactly match the desired brightness level. Nevertheless, the perceivability of the brightness variation may be reduced by smoothly transitioning from perceived brightness level of the first portion 136 to the perceived brightness level of the second portion 138. In fact, using a gradient may enable the size of the buffer to be reduced since the buffer may store only image data corresponding with the transition portion 140 instead of the image data corresponding with entire the second portion 138 or the image data corresponding with the entire second image frame 130.

Additionally, as described above, the likelihood of perceivable visual artifacts may be reduced by under-driving (e.g., decreasing) the grayscale value when the desired brightness level of successively display image frames is decreasing by more than a threshold amount. To help illustrate, two successively displayed image frames that can be displayed on the electronic display 12 are described in FIGS. 14A-14C. More specifically, FIGS. 14A-14C describe a first image frame 142 and a second image frame 144 displayed immediately after the first image frame 142.

Figure 14A:
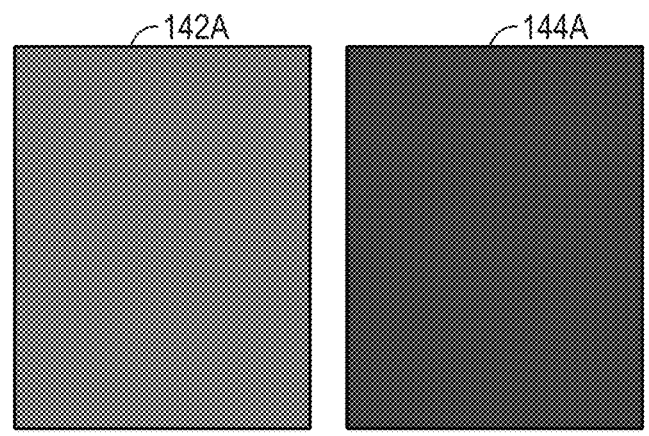
FIG. 14A illustrates successively displayed image frames with decreasing brightness levels, in accordance with an embodiment.

FIG. 14A describes the desired brightness level (e.g., target grayscale value) of the first image frame 142A and the second image frame 144A. In other words, the image frames 142A and 144A may be displayed when image data received from image source is written to the display pixels 42 without the use of an intra-frame pause. Additionally, as depicted, the desired brightness level decreases from the first image frame 142A to the second image frame 144A. In other words, the electronic display 12 is successively displaying image frames with decreasing brightness levels.

Figure 14B:
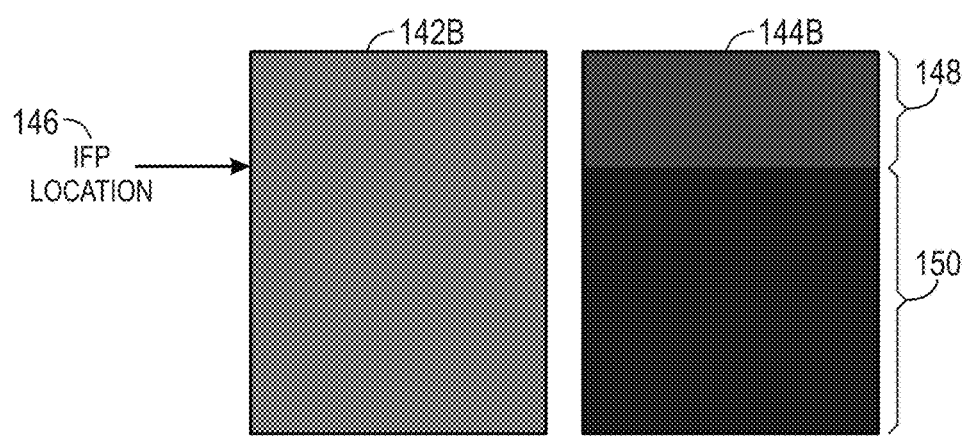
FIG. 14B illustrates the image frames of FIG. 14A with a first embodiment of artifact compensation, in accordance with an embodiment.

FIG. 14B describes the grayscale value written to the display pixels 42 to achieve the desired brightness levels when an intra-frame pause 146 is used. In other words, a first portion 148 of the image frames 142B and 144B are displayed before the intra-frame pause 146 and a second portion 150 of the image frames 142B and 144B are displayed after the intra-frame pause 146. For the purpose of illustration, we assume that the grayscale value for each of the pixels in the second portion 150 is expected to change by more than the threshold amount between the first image frame 142B and the second image frame 144B. Accordingly, as depicted, the grayscale values written to the display pixels in the second portion 138 of the second image frame 130B are under-driven (e.g., decreased).

It is noted that the second image frame 144B is merely one instant in time. As described above, the grayscale value of the display pixels may be under-drive by decreasing the grayscale value at a faster rate. For example, the grayscale value of the first portion 148 may initially be higher (e.g., brighter) than the grayscale value of the second portion 150 due to the intra-frame pause 146. However, since decreased at a faster rate, the grayscale value of the second portion 150 may decrease below the grayscale value of the first portion 148. In this manner, the user's eyes may average the changing grayscale value of the second portion 150 and perceive the second image frame 144B at the desired brightness level.

Figure 14C:
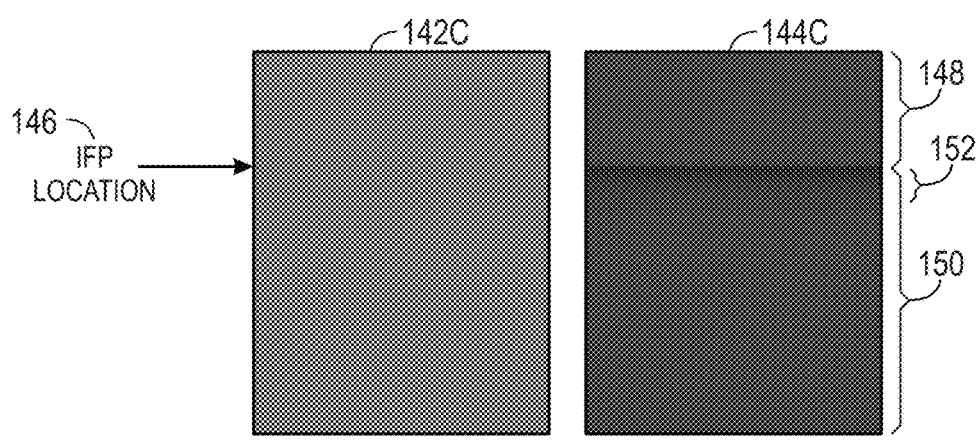
FIG. 14C illustrates the image frames of FIG. 14A with a second embodiment of artifact compensation, in accordance with an embodiment.

In other embodiments, it may be possible to reduce the perceivability of visual artifacts by using a transition portion 152 between the first portion 148 and the second portion 150 as described in FIG. 14C. As depicted, the display pixels closer to the intra-frame pause 146 may be under-driven more than display pixels further from the intra-frame pause 146. In this manner, the user's eyes may average the grayscale values written to the transition portion 152 so that a smooth brightness transition is formed between the first portion 148 and the second portion 150 of the second image frame 144C.

As such, the brightness level of the second image frame 144C may not exactly match the desired brightness level. Nevertheless, the perceivability of the brightness variation may be reduced by smoothly transitioning from perceived brightness level of the first portion 148 to the perceived brightness level of the second portion 150. In fact, using a gradient transition portion 152 may enable the size of the buffer to be reduced since the buffer may store only image data corresponding with the transition portion 152 instead of the image data corresponding with entire the second portion 150 or the image data corresponding with the entire second image frame 144.

Accordingly, the technical effects of the present disclosure include improving user touch detection accuracy in an electronic display through the use of intra-frame pauses without generating perceivable visual artifacts. More specifically, the electronic display may use intra-frame pauses to check for a user touch at a higher frequency. Additionally, the likelihood of the intra-frame pause causing perceivable visual artifacts may be reduced by adjusting (e.g., over-driving or under-driving) the grayscale valued written to the display pixels. In this manner, a user's eyes may average out the brightness level of the display pixels so that the perceived brightness level is as desired.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An electronic display, comprising:
   display driver circuitry configured to display an image frame on the electronic display using a first display pixel and a second display pixel;
   touch sensing circuitry configured to detect user interaction with the electronic display; and
   a timing controller configured to:
      receive image data, wherein the image data describes a target grayscale value of the first pixel and the second pixel to display the image frame;
      instruct the display driver circuitry to display a first portion of the image frame by writing the image data to the first display pixel;
      instruct the touch sensing circuitry to determine whether a user touch is present on a surface of the electronic display after the first portion of the image frame is displayed;
      determine grayscale value displayed by the second display pixel to display a previous image frame; and
      instruct the display driver circuitry to display a second portion of the image frame by writing adjusted image data to the second display pixel when the displayed grayscale value differs from the target grayscale value of the second pixel by more than a threshold amount.

2. The electronic display of claim 1, wherein the timing controller is configured to determine the adjusted image data by adjusting the target grayscale value of the second display pixel based at least in part on amount the displayed grayscale value differs from the target grayscale value of the second pixel.

3. The electronic display of claim 1, wherein the timing controller is configured to determine the adjusted image data by over-driving the target grayscale value of the second display pixel when the displayed grayscale value is lower than the target grayscale value.

4. The electronic display of claim 1, wherein the timing controller is configured to determine the adjusted image data by under-driving the target grayscale value of the second display pixel when the displayed grayscale value is higher than the target grayscale value.

5. The electronic display of claim 1, comprising a buffer configured to store the image data, the adjusted image data, and image data written to the second display pixel to display the previous image;
   wherein the timing controller is configured determine the displayed grayscale value of the second display pixel by retrieving the image data written to the second display pixel to display the previous image frame from the buffer.

6. The electronic display of claim 1, wherein the timing controller is configured to instruct the display comments to stop writing image data to display pixels while the touch sensing circuitry determine whether the user touch is present on a surface of the electronic display.

7. The electronic display of claim 1, wherein the touch sensing circuitry comprise a touch sensing pixel configured to detect presences and position of the user touch based at least in part on an impedance change at the touch sensing pixel.

8. A tangible, non-transitory, computer readable medium storing instructions executable by a processor of an electronic display configured to display an image frame, wherein the instructions comprise instructions to:
 receive, using the processor, image data corresponding with the image frame;
 instruct, using the processor, the electronic display to write the image data to display pixels in the electronic display to display a portion of the image frame;
 instruct, using the processor, the electronic display to pause writing the image data once the portion of the image frame is displayed;
 adjust, using the processor, the image data due to the pause by adjusting grayscale value of the image data;
 instruct, using the processor, the electronic display to write the adjusted image data to the display pixels after the pause.

9. The computer readable medium of claim 8, comprising instructions to instruct, using the processor, the electronic display to determine whether a user touch is present on a surface of the electronic display during the pause.

10. The computer readable medium of claim 8, wherein the pause causes a delay between writing the image data and writing the adjusted image data to the display pixels.

11. The computer readable medium of claim 8, wherein the instruction to adjust the image data comprises instructions to over-drive the grayscale value of the image data or under-drive the grayscale value of the image data.

12. A method comprising:
 writing a first set of grayscale values to a first row of display pixels on an electronic display to display a first portion of a first image frame;
 writing a second set of grayscale values to a second row of the display pixels to display a first portion of a second image frame while the first portion of the first image frame is displayed;
 receiving a first user input after the first portion of the second image frame is displayed via a user input device;
 writing a third set of grayscale values to the first row of display pixels to display a second portion of the second image frame after receiving the first user input, wherein the third set of grayscale values is determined based at least in part on difference between the first set of grayscale values and a fourth set of grayscale values received from an image source, wherein the fourth set of grayscale values indicates desired brightness level of the first row of display pixels when the second image frame is displayed.

13. The method of claim 12, comprising:
 writing a fifth set of grayscale values to a third row of display pixels on an electronic display to display a second portion of the first image frame;
 receiving a second user input after the second portion of the second image frame is displayed via the user input device;
 writing a sixth set of grayscale value to the third row of display pixels to display a third portion of the second image frame after receiving the second user input, wherein the sixth set of grayscale values is determined based at least in part on difference between the fifth set of grayscale values and a seventh set of grayscale values received from the image source, wherein the seventh set of grayscale values indicates desired brightness level of the third row of display pixels when the second image frame is displayed.

14. The method of claim 12, wherein the third set of grayscale values increases at a faster rate than the fourth set of grayscale values when the first set of grayscale values is lower than the fourth set of grayscale values.

15. The method of claim 12, wherein the third set of grayscale values decreases at a faster rate than the fourth set of grayscale values when the first set of grayscale values is higher than the fourth set of grayscale values.

16. The method of claim 12, comprising storing the third set of grayscale values in a buffer to enable the third set of grayscale values to be determined when a third image frame is displayed immediately after the second image frame.

17. The method of claim 12, wherein the user input device comprises a touch sensing pixel in the electronic display, wherein the touch sensing pixel is configured to determine occurrence and position of the first user input on a surface of the electronic display.

18. A tangible, non-transitory, computer readable medium storing instructions executable by a processor of an electronic display configured to successively display a first image frame and a second image frame, wherein the instructions comprise instructions to:
 detect, using the processor, a first intra-frame pause;
 determine, using the processor, grayscale value displayed by a first display pixel displaying the first image frame during the first intra-frame pause;
 determine, using the processor, a target grayscale value of the first display pixel to display the second image frame;
 determine, using the processor, a first adjusted grayscale value when the displayed grayscale value of the first display pixel differs from a target grayscale value of the first display pixel by more than a threshold amount, wherein the first adjusted grayscale value is written to the first display pixel after the first intra-frame pause to enable the second image frame to be perceived as desired.

19. The computer readable medium of claim 18, comprising instructions to determine occurrence and position of a user touch on a surface of the electronic display during the first intra-frame pause.

20. The computer readable medium of claim 18, comprising instructions to:
 detect, using the processor, a second intra-frame pause;
 determine, using the processor, grayscale value displayed by a second display pixel displaying the first image frame during the second intra-frame pause;
 determine, using the processor, a target grayscale value of the second display pixel to display the second image frame;
 determine, using the processor, a second adjusted grayscale value when the displayed grayscale value of the second display pixel differs from a target grayscale value of the second display pixel by more than the threshold amount, wherein the second adjusted grayscale value is written to the second display pixel after the second intra-frame pause to enable the second image frame to be perceived as desired.

21. The computer readable medium of claim 18, wherein the adjusted grayscale values increase at a faster rate than the target grayscale value when desired brightness level of the second image frame is higher than desired brightness level of the first image frame.

22. The computer readable medium of claim 18, wherein the adjusted grayscale values decreases at a faster rate than the target grayscale value when desired brightness level of the second image frame is lower than desired brightness level of the first image frame.

23. The computer readable medium of claim 18, wherein perceived brightness level of the first display pixel when the first adjusted grayscale value is written to the first display pixel after the first intra-frame pause is equal to perceived brightness level of the first display pixel when the target grayscale value is written to the first display pixel without the first intra-frame pause.

24. A timing controller in a touch-sensitive electronic display configured to successively display a first image frame and a second image frame, comprising:
  a comparator configured to determine whether a target grayscale value differs from a displayed grayscale value by more than a threshold amount, wherein the displayed grayscale value is a grayscale value stored by a display pixel to display the first image frame during an intra-frame pause and the target grayscale value is a grayscale value of the display pixel corresponding with the second image frame; and
  a grayscale adjustment look-up table configured to determine an adjusted grayscale value when the displayed grayscale value differs from the target grayscale value by more than the threshold amount, wherein the adjusted grayscale value is determined based at least in part on amount the target grayscale value and the displayed grayscale value differ, wherein the adjusted grayscale value is written to the display pixel after the intra-frame pause to display the second image frame as desired.

25. The timing controller of claim 24, wherein the timing controller is configured to instruct a touch sensing pixel to determine whether a user touch is present on a surface of the electronic display during the intra-frame pause.

26. The timing controller of claim 24, wherein the grayscale adjustment look-up table and the threshold amount are predetermined and stored in memory in the timing controller.

27. The timing controller of claim 24, comprising a buffer configured to store the displayed grayscale value, the target grayscale value, and the adjusted grayscale value.

\* \* \* \* \*